United States Patent Office 3,575,904
Patented Apr. 20, 1971

3,575,904
LATICES COMPRISING POLYMER MONOMER AND AUTOXIDIZABLE MATERIAL
Michael Raymond Clarke, Frankstone, Victoria, Australia, assignor to Balm Paints Limited, Melbourne, Victoria, Australia
No Drawing. Continuation-in-part of application Ser. No. 516,690, Dec. 27, 1965. This application Dec. 28, 1966, Ser. No. 605,169
Claims priority, application Australia, Jan. 5, 1965, 53,587/65
Int. Cl. C09d 5/02
U.S. Cl. 260—23                                16 Claims

ABSTRACT OF THE DISCLOSURE

A composition which comprises a dispersion of film-forming polymer in an aqueous liquid, an autoxidizable material which in the presence of oxygen provides radicals to initiate addition polymerization, and an ethylenically unsaturated monomer which is readily homopolymerisable by such radicals. When this composition is exposed to air, particularly as a thin film of coating composition such as paint, autoxidation of the autoxidizable material takes place to provide radicals capable of polymerizing an ethylenically unsaturated monomer and a polymerization reaction occurs, the autoxidizable material also being itself modified by the autoxidation and/or subsequent polymerization reaction. This modification of the autoxidizable material and/or the polymerization reaction can be made use of in hardening up a polymer film formed from particles initially soft enough to integrate at the film-forming temperature.

---

This is a continuation-in-part of U.S. patent application Ser. No. 516,690 filed Dec. 27, 1965, now abandoned.

This invention relates to compositions containing dispersions of film-forming polymer in aqueous liquids and to the preparation of films from such compositions.

In general the usual mode of formation of an integrated film on a substrate from a coating of an aqueous dispersion of film-forming polymer involves coalescence of the individual polymer particles of the dispersion as the liquid phase is evaporated. To achieve the degree of coalescence required for a well-integrated film it is necessary for the dispersed polymer to have a glass transition temperature equal to or lower than the temperature at which the film is to be formed. Unless the polymer is inherently soft enough to coalesce at room temperature, the coating must be heated or alternatively the glass transition temperature of the polymer is effectively lowered, at least temporarily, by the presence of a plasticiser and/or a coalescing agent. Conventional coalescing agents and/or plasticisers may lower the glass transition temperature of the polymer so that the film initially formed is soft. Coalescing agents are normally volatile so that as they evaporate the film becomes harder. On the other hand plasticisers are present in polymer dispersions additionally to impart flexibility to the final film and evaporate less readily, if at all, from the film. Thus if a blend of hard polymer with a relatively involatile coalescing agent and/or with a conventional plasticiser, which is an effective coalescing agent for the polymer particles, or indeed if a soft polymer is used in the dispersion, the resulting initially soft film will remain soft so that it is unsuitable in applications which require surface hardness. Moreover such films will probably have the added defect of collecting and retaining dirt particles on their surfaces. On the other hand when a volatile coalescing agent is employed with a dispersion of hard polymer in addition to the disadvantage of loss of the volatile components, changes in stability of the dispersed phases may lead to such problems as flocculation of one or more of the dispersed components as the volatile material evaporates. Since these problems vary depending upon the components and the conditions of film formation, the formulation of suitable compositions based on polymer dispersions has hitherto been a matter of compromise. There has therefore been a demand for a composition containing a dispersion of film-forming polymer in which the polymer particles at the coalescence stage are sufficiently "soft" to provide a well integrated film which is subsequently converted to a harder state without the known disadvantages experienced, for example, with conventional plasticisers and/or coalescing agents.

Films from compositions based on dispersions of polymer, for example paints, adhesives or other coating compositions, are invariably formed in the presence of atmospheric oxygen and we have now found that compositions containing dispersions of film-forming polymer to be used in these conditions are improved by the presence of an autoxidizable material which can initiate addition polymerisation on exposure to air and an ethylenically unsaturated monomer.

According to this invention we provide a composition which comprises a dispersion of film-forming polymer in an aqueous liquid, an autoxidizable material which in the presence of oxygen provides radicals to initiate addition polymerisation, and an ethylenically unsaturated monomer which is readily homopolymerisable by such radicals.

When this composition is exposed to air, particularly as a thin film of coating composition such as paint, autoxidation of the autoxidizable material takes place to provide radicals capable of polymerising an ethylenically unsaturated monomer and a polymerisation reaction occurs, the autoxidizable material also being itself modified by the autoxidation and/or subsequent polymerisation reaction. This modification of the autoxidizable material and/or the polymerisation reaction can be made use of in hardening up a polymer film formed from particles initially soft enough to integrate at the film-forming temperature.

A redox catalyst may optionally be present in the composition which may catalyse the autoxidation and/or polymerisation processes. Alternatively the rate at which these processes proceed may be increased by an increase in the temperature.

In our composition the monomer and/or the autoxidizable material may serve as plasticisers lowering the effective glass transition temperature of the film-forming polymer so as to enable even relatively hard polymers to integrate at the film-forming temperature. The plasticising effect of these materials is then reduced or even eliminated and the hardness of the integrated film increased by the subsequent autoxidation of the autoxidizable material and conversion of the monomer to polymer.

In another embodiment of the invention, the autoxidation and polymerisation reactions which occur following exposure of the composition to air may be used to crosslink the film-forming polymer or alternatively to provide a "hard" second polymer component which will up-grade the hardness of the final film. In this case the dispersed polymer itself may initially be sufficiently soft to integrate without plasticisation by autoxidizable material or monomer, these materials being used to harden up the polymer film after integration, e.g. by crosslinking or production of hardening polymer.

In such compositions it may not be necessary or desirable for the autoxidizable material to be a coalescing agent or a plasticiser for the disperse polymer. It is, however, common practice to add thickeners to dispersions of film-forming polymers in an aqueous liquid to control the rheological properties of the said dispersions so that in the circumstances we have described above it is convenient to use a thickener which is also an autoxidizable material. An autoxidizable thickener may be but is not necessarily the only autoxidizable material in the composition; for example it may provide a supplementary source of free radicals to those generated by an autoxidizable plasticiser.

When the autoxidizable material and/or monomer is required to have a plasticising effect to give good film integration, then the plasticising material whether monomer and/or autoxidizable material must be compatible with the film-forming polymer. Further, it is usually preferred that the products obtained on autoxidation and by polymerisation of monomer in the presence of autoxidised material should be compatible with the film-forming polymer. This is particularly desirable, for example in paint and similar compositions where incompatibility of these components might otherwise adversely affect the optical characteristics or durability of a film such as a paint film. However, the invention is not restricted to compositions in which the film-forming polymer and the products of oxidation and polymerisation are compatible.

By an aqueous liquid we mean a liquid which contains at least 50% by weight of water based on the total weight of the continuous liquid phase excluding any autoxidizable material or monomer which may be dissolved therein. Where aqueous liquid is not wholly water the balance may comprise one or more water-soluble or water-miscible organic materials such as for example mono- or polyhydric alcohols, for example methyl alcohol, ethyl alcohol, isopropyl alcohol and glycerol; alkylene glycols, for example ethylene glycol, diethylene glycol, polyethylene glycols, propylene glycol and hexylene glycol; ethers derived from lower alkanols and mono- or di-alkylene glycols, for example ethylene glycol mono- or di-methyl, ethyl or butyl ether and diethylene glycol mono- or di-methyl, ethyl or butyl ether; esters of the above-mentioned alcohols, glycols and ethers and monobasic lower aliphatic acids, for example ethyl acetate and ethylene glycol monobutyl ether acetate; lower ketones.

Film-forming polymers which are suitable in the present compositions are those which may be dispersed in aqueous liquids and which are essentially insoluble in and inert towards those liquids. The polymer may thus be chosen from a wide range of chemical types of synthetic addition and condensation polymers and natural polymers, such as the polymers of ethylenically unsaturated monomers, polyesters, polyurethanes, polyethers, polyamides.

For example, suitable addition type film-forming polymers may be derived from one or more ethylenically unsaturated monomers including acrylic, methacrylic, ethacrylic, maleic, itaconic, fumaric and crotonic acids; esters of the above unsaturated acids, as for example their methyl, ethyl, butyl, octyl, lauryl and stearyl esters, diesters or acid half esters; esters of unsaturated alcohols as for example vinyl alcohol, the esters being of, for example, inorganic acids such as hydrofluoric or organic acids such as acetic, chloroacetic, propionic and formic, or dicarboxylic acids such as oxalic acid, the second carboxyl group being left free or a proportion being esterified with a lower alcohol, for example methyl or ethyl alcohol; ethers of the unsaturated alcohols such as vinyl alcohol which may be simple ethers of a lower alkanol containing 1–4 carbon atoms in the chain, for example methyl, ethyl, propyl and butyl vinyl ethers; polar derivatives of the above-mentioned unsaturated acids such as acid chlorides, amides and methylolamides; aryl monomers as for example styrene, vinyl toluene and $\alpha$-methyl styrene; monomers providing crystalline or partially crystalline polymers as for example vinyl chloride, vinylidene chloride, acrylonitrile and methacrylonitrile; additionally a suitable co-monomer in such polymers is a diene, for example butadiene.

Suitable synthetic condensation polymers include the linear polyesters which are prepared for example, from difunctional alcohol and acid components; non-linear polyesters or alkyds which are prepared for example, by reacting a polyhydric alcohol such as glycerol with a polybasic acid or acid anhydride such as phthalic anhydride; linear polyamides prepared for example from aliphatic diamines and aliphatic dicarboxylic acids; and polymers prepared by polymerising materials which contain epoxy groups.

A suitable natural polymer is rubber.

The preferred film-forming polymer will have a glass transition temperature of between $-80°$ C. and $110°$ C. Particularly preferred film-forming polymers are those derived from a vinyl or acrylic monomer by which we mean those monomers containing vinyl acrylyl or methacrylyl groups.

For example a typical "soft" polymer is a vinyl acetate/ 2-ethyl hexyl acrylate copolymer which has a glass transition temperature of $22°$ C. At a film-forming temperature of $30°$ C., the particles in a dispersion of such a polymer will normally coalesce at the film-forming stage but the resulting film will remain soft. However, the final film may now be hardened according to the teachings of this invention.

On the other hand, a typical "hard" polymer is polyvinyl chloride of glass transition temperature of $75°$ C. The dispersed particles of such a polymer will not coalesce at a film-forming temperature of $30°$ C. but, according to this invention, the glass transition temperature may be at least temporarily lowered by autoxidizable material and/or monomer so that coalescence may occur at the film-forming stage, and the film being hardened by the subsequent oxidation and polymerisation processes.

In general when the glass transition temperature of the film-forming polymer is at least equal to the film-forming temperature, it is preferred that the autoxidizable material and/or the ethylenically unsaturated monomer is a coalescing agent and/or plasticiser for the polymer. The effective component or components must, of course, be compatible with the film-forming polymer.

In one embodiment of this invention the film-forming polymer may contain groups which are crosslinkable and the autoxidized material and/or polymerising monomer may react with such groups to further harden the film after integration. Examples of crosslinkable groups in the film-forming polymer include unsaturated groups such as vinyl groups, and peroxide groups.

By an autoxidizable material we mean a material which is attacked by oxygen and which by a subsequent regenerative process will provide free radicals to initiate addition polymerisation. Materials which are commonly known to exhibit this type of behaviour are the natural drying oils, such as for example linseed oil, which contain residues of conjugated or unconjugated unsaturated fatty acids, the unsaturated parts of these residues displaying the required characteristics of an autoxidizable material described above.

In general a methylene group adjacent at least one activating group, such as for example an ethylenically unsaturated group or an ether oxygen atom, is to be preferred in the autoxidizing material.

The autoxidizable material may be based on natural or synthetic materials such as a drying oil, for example, tung, dehydrated castor, linseed, safflower and soya oils or mixture thereof; an alkyd resin modified with one or more drying oils; allyl ethers of polyhydric materials for example allylated glycerol, polyglycerol, allylated sucrose, allylated cellulose; glycerol mono-, di- and tri-allyl ether; copolymers of vinyl and/or (meth)acrylic monomers with alloxy methyl acrylamide; vinyl dioxolanes, for example (poly)2-vinyl-1,3-dioxolanes and copolymers of 2- vinyl 1,3-dioxolane with one or more vinyl and/or acrylic monomers; esters of 2-vinyl-1,3-acetal alcohols with dibasic acids, for example phphalic, itaconic, maleic pyromellitic and sebacic acids.

Preferred autoxidizable materials of the above types are those which contain a natural or synthetic drying oil moiety or an allylic moiety.

Other suitable autoxidizable materials are polyethers and homopolymers or copolymers of vinyl pyrrolidone which in the presence of oxygen provide radicals to initiate addition polymerisation of ethylenically unsaturated monomer.

Suitable polyethers will in general be those providing methylene groups or hydrogen atoms attached to tertiary carbon atoms, adjacent activating ether oxygen atoms. For example the polyether may be:

a poly(alkylene oxide), e.g. poly(ethylene oxide), poly(butylene oxide), poly(propylene oxide) and copolymers thereof;
a poly(vinyl ether), e.g. poly(methyl vinyl ether).

The polyether molecule may contain components other than the ether-providing monomeric units but such components must not inhibit the autoxidative properties of the molecule as a whole. For example, the polyether may be poly(propylene oxide) chain-terminated by a polyol, e.g. glycerol or pentaerythritol or it may consist of blocks of poly(ethylene oxide) reacted under anhydrous conditions with a di-isocyanate to provide a higher molecular weight molecule.

Homopolymerised vinyl pyrrolidone is a suitable autoxidizable material for use according to this invention. The autoxidizable material may also be a copolymer of vinyl pyrrolidone with one or more other ethylenically unsaturated monomers, provided such co-monomers do not inhibit the autoxidation of the vinyl pyrrolidone. For example, the autoxidizable material may be a copolymer of vinyl pyrrolidone and vinyl butyl ether. It will of course be apparent that unless the copolymerised monomer or monomers are themselves autoxidizable the weight effectiveness of the molecule as a whole as a source of free radicals will be reduced by the inclusion therein of non-autoxidizable co-monomers.

Autoxidizable polyethers and vinyl pyrrolidone polymers or copolymers have a thickening action in the compositions of this invention, provided they are soluble in the aqueous liquid. To be effective as thickeners they preferably have a molecular weight of greater than 20,000 and especially when they are polymers or copolymers of vinyl pyrrolidone the molecular weight may be within the range of 500,000 to 1 million. The actual molecular weight will depend on the degree of thickening which is to be imparted to the composition at an acceptable level of thickener concentration, typically 0.1% to 10.0% by weight of the disperse polymer particles.

The choice of a suitable autoxidizable material will depend on whether it is to serve as a plasticiser for the film-forming polymer in addition to its autoxidizing function. In general it is preferred that the autoxidizing material is compatible with the film-forming polymer and of course, when it is to serve as a plasticiser it must be compatible. A convenient method of improving the compatibility of an autoxidizing material with the disperse polymer is to incorporate an autoxidizable moiety such as for example, the di- or tri-allyl derivatives of a polyol such as glycerol, trimethylolpropane or pentaerythritol in the form of a derivative of a vinyl and/or acrylic polymer which is itself compatible with the disperse polymer. Thus a suitable autoxidizing material can be produced by the esterification of a methyl methacrylate/acrylic acid copolymer with diallyl glycerol.

In general the ethylenically unsaturated monomer which is readily homopolymerised by free radicals is one in which the radical-bearing monomer is substantially unstable and highly reactive so that it can add on other molecules of the same monomer to produce a homopolymer chain, the radical being transferred to the end of the chain thereby preserving its reactivity. Monomers which when bearing radicals have some degree of stability, for example monomers containing an allyl group, are not suitable by themselves in this invention although they may be employed as a co-monomer together with the readily homopolymerisable monomer. Other readily homopolymerisable monomers may also be used as co-monomers.

Ethylenically unsaturated monomers suitable for use in the compositions of this invention include vinyl and acrylic monomers such as those listed above with reference to the disperse film-forming polymer. Where the film-forming polymer is an addition polymer the monomer present in the composition may be similar to that used in making the film-forming disperse polymer.

The particular monomer to be used in the composition may be chosen primarily for its ability to plasticise and/or coalesce the particles of film-forming polymer or for its ability to provide a hard polymer component which will up-grade the hardness of the final film, or by reason of a combination of these and other characteristics. Thus by suitable choice of monomer or mixtures of monomers in conjunction with the autoxidizable material suitable film integration may be achieved and the degree of hardness of the final film can be varied.

A degree of crosslinking may also be introduced by employing a monomer which is polyfunctional with respect to ethylenically unsaturated groups.

The monomer will generally have a boiling point greater than 50° C. and preferably greater than 110° C. to minimise loss of monomer by evaporation from the composition, e.g. whilst it is exposed to the atmosphere as a film.

Particularly suitable monomers and their mixtures are those which readily polymerise under the conventional free radical polymerisation conditions such as the alkyl acrylates, methacrylates, and itaconates substiuted alkyl methacrylates such as hydroxy alkyl methacrylates, alkyl fumarates, vinyl benzene derivatives such as vinyl toluene and styrene, and vinyl esters. Mixtures of such monomers may be used and monomers normally difficult to homopolymerise in the presence of free radicals such as maleates may be employed as co-monomers. Particularly preferred monomers are the $C_2$–$C_{18}$ alkyl acrylates and methacrylates, and hydroxy alkyl methacrylates and vinyl toluene. Alternatively, relatively high molecular weight ethylenically unsaturated materials other than the film-forming polymer may be present as the monomer component, e.g. polyester chains of a molecular weight of several thousand having a terminal ethylenically unsaturated group. As already indicated the autoxidation of autoxidizable material and the polymerisation of monomer may be accelerated by raising the film-forming temperature or alternatively by the presence of a redox catalyst. Although in general the advantage of this invention is best obtained at ambient temperatures, the formation of film from the compositions can be carried out at an elevated temperature, for example up to 140° C., but appropriately higher boiling monomers should then be selected to reduce loss by volatilization.

The redox catalyst may be a conventional autoxidation-promoting "drier" such as an organic salt of cobalt, iron, manganese or cerium or an inorganic redox catalyst such as sodium bisulphite which is soluble in the film-forming polymer and preferably also in the aqueous continuous phase.

The choice of autoxidizable material, monomer and optional redox catalyst and the relative proportions which are to be combined with the dispersion of film-forming polymer will depend upon such factors as the nature of the continuous liquid phase, the degree of plasticisation, if any, of the polymer, or the hardness of the final film which is to be achieved, and the relative compatibilities or solubilities of the various components.

Suitable proportions of ethylenically unsaturated monomer range from 2.0–25% by weight of the film-forming polymer and in paint compositions from 2.5–10% by weight of film-forming polymer is preferred.

Suitable proportions of autoxidizable material range from 0.5–50% by weight of the film-forming polymer. Clearly the relative proportion of autoxidizable material to the other components will depend on its content of radical generating groups. Generally in paint compositions the autoxidizable material is present in a proportion of from 2.5–25% by weight based on the weight of film-forming polymer. When a metal-drier redox catalyst is employed this is preferably present in an amount of from 0.1–5% by weight of metal based on the weight of autoxidizable material.

The present compositions are prepared by mixing and stirring the components at such a rate that coagulation does not occur and with a minimum of aeration. When the autoxidizable material is also a thickener we prefer to add the thickener to the other components as a preformed aqueous solution containing 8–20% of thickener, to facilitate mixing.

The compositions may also contain other components than those already specified such as for example, wetting agents, stabilisers, thickeners, plasticisers, coalescing agents and the like.

In particular the present compositions may be pigmented and as a further feature of the invention we provide pigmented compositions suitable for use as a paint comprising a composition as herein described which additionally contains dispersed pigment in a proportion of from 5–65% by volume of the disperse phase.

As stated above, in paint compositions the products of oxidation and polymerisation are preferably compatible with the film-forming polymer particularly in high gloss paints. A simple test of compatibility is to cast a film of the unpigmented composition; if the dried film is clear or no more than slightly opalescent then this requirement is met.

As a further feature of the invention we provide a process of forming a hard coating on a substrate which comprises applying to said substrate a composition as herein described, and substantially removing readily volatile components from the composition in the presence of oxygen to allow autoxidation of the autoxidizable material and polymerisation of the ethyleneically unsaturated monomer.

The invention is illustrated by the following examples in which parts and percentages are by weight, except where otherwise expressed.

EXAMPLE I

This example illustrates the effect on film properties of adding an ethylenically unsaturated monomer, autoxidisable material and redox catalyst to an aqueous acrylic copolymer latex, containing 50% of a methyl methacrylate/2 ethyl hexyl acrylate (85:15) copolymer. The copolymer had a glass transition temperature of about 40° C.

A portion of the acrylic latex containing 82.50 parts of total solids was stirred for one hour with 0.75 part of a nonyl phenol/ethylene oxide co-condensate stabiliser containing 8 mol of ethylene oxide per mol of nonyl phenol and 8.50 parts of water. To this mixture was added at a uniform rate over a period of one hour, 8.25 parts of glycerol triallyl ether, stirring being maintained during this addition and continued for a further 8 hours.

To a second portion of the acrylic latex containing 82.50 parts of total solids was added in similar manner, 0.75 part of the co-condensate stabiliser and 8.50 parts of water. To this mixture was added at a uniform rate over a period of one hour, 4.13 parts of glycerol triallyl ether together with 4.13 parts of hydroxy ethyl methacrylate, stirring again being maintained during this addition and continued for a further 8 hours.

A third portion of latex containing 82.50 parts of total solids was treated in the same manner as the second portion, but including with the glycerol triallyl ether and hydroxy ethyl methacrylate sufficient "Cyclodex" ("Cyclodex" is a registered trademark for a commercially available water-soluble, organic salt of cobalt) to provide 0.42% by weight of cobalt calculated as cobalt metal on the treated latex polymer solids as a redox catalyst.

Films about 2 mil thick of the three portions treated as above and of untreated acrylic latex were separately spread on plate glass and allowed to air-dry at room temperature (20° C.).

The treated portions of latex all dried to give smooth, well-integrated continuous films whereas the untreated latex has a granular appearance due to incomplete integration of the polymer particles. After 24 hours and thereafter 5 days the hardness of each film was measured using a diamond indentation hardness tester, the hardnesses being expressed as, and being inversely proportional to, the length of the diamond impression. The results were as follows:

| Autoxidisable material | Unsaturated monomer | Redox catalyst | Length of diamond impression | |
|---|---|---|---|---|
| | | | 24 hrs. | 5 days |
| A | A | A | 3.0 | |
| P | A | A | 6.3 | 6.0 |
| P | P | A | 5.0 | 4.5 |
| P | P | P | 4.2 | 4.0 |

Note.—A=absent; P=present.

It will be seen that the glycerol triallyl ether had a pronounced softening effect on the film and showed little recovery after 5 days, in the absence of the unsaturated monomer. In the presence of the unsaturated monomer both with and without the redox catalyst, the hardness of the treated latex films were markedly improved, especially after five days, the rate and degree of hardening being most satisfactory in the presence of the redox catalyst.

EXAMPLES II–XIV

These examples show the hardening over a period of 7 days of films cast from various latexes modified with vinyl toluene and a number of different autoxidisable materials. All examples were made to the same basic formulation which follows, using the method of Example I.

| | |
|---|---|
| Latex to provide _____parts total solids__ | 82.50 |
| Co-condensate stabiliser as in Example I __parts__ | 0.75 |
| Water _____do____ | 8.50 |
| Vinyl toluene _____do____ | 4.13 |
| Autoxidisable material _____do____ | 4.13 |

The cobalt redox catalyst was again "Cyclodex" cobalt in sufficient concentration to provide a proportion of 0.42% by weight of cobalt calculated as cobalt metal based on the weight of latex polymer solids. The sodium bisulphite redox catalyst was added to the latex with the 8.50 parts of water to provide a proportion based on the total weight of related latex polymer solids of 0.2% by weight.

The latexes are identified as follows:

No. 1.—A 50/50 methyl methacrylate/2-ethylhexyl acrylate copolymer having a glass transition temperature of 5° C. and of 50% solids content.

No. 2.—An 85/15 methyl methacrylate/2-ethylhexyl acrylate copolymer having a glass transition temperature of 30° C., and of 50% solids content.

No. 3.—A 75/25 vinyl acetate/2-ethylhexyl acrylate copolymer having a glass transition temperature of 0° C. and of 50% solids content.

No. 4.—A 52/48 styrene/2-ethylhexyl acrylate copolymer having a glass transition temperature of 0° C. and of 50% solids content.

The method of testing is carried out according to Example I.

| Example No. | Latex No. | Autoxidisable material | Redox catalyst | Length of diamond impression | |
|---|---|---|---|---|---|
| | | | | 1 day | 7 days |
| Controls | 1 | Nil | Nil | 5.3 | 5.2 |
| | 2 | Nil | Nil | 3.0 | 2.7 |
| | 3 | Nil | Nil | 6.3 | 5.0 |
| | 4 | Nil | Nil | 6.6 | 6.4 |
| 2 | 3 | Dehydrated castor oil | Nil | 9.2 | 8.0 |
| 3 | 3 | ..do.. | Cobalt | 5.3 | 4.7 |
| 4 | 4 | ..do.. | Nil | 6.8 | 5.0 |
| 5 | 4 | ..do.. | Cobalt | 5.3 | 4.7 |
| 6 | 1 | Dehydrated castor oil modified alkyd resin | Bisulphite | 6.0 | 5.1 |
| 7 | 3 | Allylated polyglycerol | Nil | 6.9 | 6.1 |
| 8 | 3 | ..do.. | Cobalt | 5.2 | 4.5 |
| 9 | 4 | ..do.. | ..do.. | 5.2 | 4.5 |
| 10 | 2 | Glycerol monoallyl ether | Bisulphite | 4.5 | 3.2 |
| 11 | 2 | Glycerol diallyl ether | Bisulphite and cobalt | 5.0 | 4.0 |
| 12 | 2 | Glycerol triallyl ether | ..do.. | 4.5 | 4.0 |
| 13 | 1 | Linseed oil modified alkyd resin | ..do.. | 6.7 | 5.7 |
| 14 | 1 | Tung oil | ..do.. | 7.0 | 5.8 |

Latexes 1, 3 and 4 contain particles of a "soft" copolymer which at room temperature normally provide a well integrated film when the latex dries. Latex 2 contains particles of a relatively "hard" copolymer which at room temperature do not provide a well integrated film on drying.

However, when vinyl toluene and autoxidising material were present in latexes 1, 3 and 4 the polymer particles integrated well into a film when the latexes were dried and the film subsequently increased in hardness over a period of seven days more than the films formed from the corresponding control latexes. Although the autoxidizable materials were all relatively soft and therefore could be expected to have a plasticising action on the dried films, it will be seen that the films formed from Examples Nos. 3, 4, 5, 8 and 9 all attained a hardness greater than that of the corresponding control latexes within seven days. When vinyl toluene and autoxidising material were present in latex 2, a well integrated film was formed on drying the latex and after 7 days the hardness of the film approached that of the film prepared from the unmodified latex.

EXAMPLES XV–XXII

These examples demonstrate the use of different ethylenically unsaturated monomers in compositions according to this invention. The formulation and testing procedure follows that for Examples II–XIV and latexes are as identified in those examples.

EXAMPLE XXIII

Preparation of a latex paint from a latex containing autoxidisable material, ethylenically unsaturated monomer and redox catalyst.

To 1505 parts of an aqueous latex containing a 40/60 methyl methacrylate/ethyl acrylate copolymer of glass transition temperature 5° C. and containing 46% total solids were added with constant stirring, 0.2 part of a non-ionic wetting agent and 300 parts of water, stirring being continued for one hour. To this mixture was added at a uniform rate over a period of one hour, 100 parts of allylated polyglycerol, 200 parts of vinyl toluene and 0.04 part of "Cyclodex" cobalt, stirring again being maintained during this addition and continued for a further 8 hours. This product will be referred to as the modified latex.

A pigment paste was prepared by roller-milling, the following components to a homogeneous mixture:

| | Parts |
|---|---|
| Methyl cellulose thickener | 0.32 |
| Water | 20.96 |
| Soya lecithin solution containing (30% in water) | 1.50 |
| Sodium hexametaphosphate solution (17% in water) | 3.40 |
| Rutile titanium dioxide | 73.82 |
| | 100.00 |

Modified latex was added slowly, with stirring, to a portion of the pigment paste, to give pigmented latex paint

| Example No. | Latex No. | Autoxidisable material | Unsaturated monomer | Redox catalyst | Length of diamond impression | |
|---|---|---|---|---|---|---|
| | | | | | 1 day | 7 days |
| Controls | 1 | Nil | Nil | Nil | 5.3 | 5.2 |
| | 2 | Nil | Nil | Nil | 3.0 | 2.7 |
| | 4 | Nil | Nil | Nil | 6.6 | 6.4 |
| 15 | 1 | Dehydrated castor oil | Butyl methacrylate | Bisulphite | 7.0 | [1] 5.7 |
| 16 | 2 | Allylated polyglycerol | Dibutyl fumarate | Cobalt | 6.0 | 5.0 |
| 17 | 2 | Dehydrated castor oil | Divinyl benzone | Nil | 5.0 | 3.1 |
| 18 | 2 | Glycerol monoallyl ether | 2-ethylhexyl acrylate | Bisulphite | 7.0 | 6.2 |
| 19 | 2 | ..do.. | ..do.. | Bisulphite and cobalt | 7.5 | 5.6 |
| 20 | 2 | ..do.. | Hydroxymethyl methacrylate | Nil | 5.7 | 4.2 |
| 21 | 2 | ..do.. | ..do.. | Cobalt | 2.4 | 2.4 |
| 22 | 4 | Allylated polyglycerol | Lauryl methacrylate | ..do.. | 8.0 | [2] 7.5 |

[1] (5.0)—14 days.
[2] (6.0)—14 days.

Unmodified latex 2 contains particles of a relatively hard polymer which do not integrate well as a film when the latex is dried, but when modified with monomer and autoxidisable material and optionally a catalyst, the film is well integrated and subsequently becomes harder.

Unmodified latexes 1 and 4 contain particles of a soft polymer which integrate well at the film-forming temperature. When there is additionally present monomer and autoxidisable material and optionally catalyst the film is well integrated and becomes harder than the film formed from the unmodified latex.

having a pigment volume concentration of 19%. A second pigmented latex paint was prepared in the same way from a further portion of the pigment paste but using unmodified aqueous copolymer latex instead of the modified latex, to provide a reference standard paint.

Both paints, when brushed out on pre-primed hardboard sheet, produced satisfactory integrated films. The initial air-drying rate of both films was similar but once they had reached the touch-dry stage the standard paint showed only a slight increase in hardness with time whereas the paint based on the modified latex continued to harden appreciably over a period of 24 hours to a final hardness much greater than that of the standard paint.

EXAMPLE XXIV

The beneficial influence on the resistance to dirt collection of a pigmented aqueous latex paint when the latex is modified with an autoxidisable material, an ethylenically unsaturated monomer and a redox catalyst is shown in the following test.

A latex paint was prepared using different proportions of a latex containing a 40/60 methyl methacrylate/ethyl acrylate copolymer of gross transition temperature 5° C., at a pigment volume concentration of 19%, using the pigment paste and method of incorporation of Example XXIII.

| Paint Number | Copolymer latex, parts | Allylated polyglycerol, parts | Vinyl toluene, parts | Cobalt plus redox catalyst, parts |
|---|---|---|---|---|
| 1 | 100 | | | |
| 2 | 70 | 30 | | 0.6 |
| 3 | 70 | 20 | 10 | 0.4 |

Films 2.4 mil thick of each paint were spread on plate glass, allowed to dry at room temperature and the hardness tested after 24 hours using a diamond hardness tester.

Exterior exposure tests were carried out on Parana Pine and Ash panels, two coats of paint being applied by brush to the bare timber, allowing time for the first coat to become touch-dry before applying the second. The panels were exposed at 45° to the horizontal and facing the equator for three months and then rated visually for dirt collection, after lightly wiping with a damp cloth to remove loose surface dirt.

The results were as follows:

| Paint Number | Length of diamond impression | Degree of dirt collection |
|---|---|---|
| 1 | 5.9 | High |
| 2 | 5.6 | Do. |
| 3 | 4.6 | Low. |

The unmodified latex contained particles of a soft polymer which integrated well to form a film but the film was soft. When the latex was modified with autoxidisable material, monomer and catalyst, the film from the modified latex was substantially harder after 3 months than that from the unmodified latex.

EXAMPLE XXV

This example illustrates the use of polyethers and polyvinyl pyrrolidone as autoxidizable materials.

The latex was an aqueous acrylic copolymer latex containing approximately 50% of a methyl methacrylate/2-ethyl hexyl acrylate (85:15) copolymer, the polymerisable monomer was vinyl toluene and the redox catalyst a commercially available water-soluble organic salt of cobalt known as "Cyclodex" Cobalt. ("Cyclodex" is a registered trademark).

The autoxidizable materials are identified so follows:

No. 1.—Polyethylene oxide, molecular weight approximately 20,000.

No. 2—Polyvinyl pyrrolidone, molecular weight greater 750,000.

No. 3.—A random copolymer of ethylene oxide and propylene oxide (80:20) and molecular weight approximately 2,500 reacted with toluene diisocyanate to produce a copolymer with an average molecular weight of the order of 20,000.

No. 4.—A random copolymer of ethylene oxide and propylene oxide (80:20) with a molecular weight of approximately 500,000.

To a portion of the aqueous acrylic copolymer latex containing 82.50 parts of copolymer solids was added with continuous stirring 6.20 parts of thickener No. 1 (as a 10% aqueous solution) and then, at a uniform rate over a period of one hour, 6.20 parts of vinyl toluene. The latex so-treated was allowed to age for three days.

Sufficient "Cyclodex" Cobalt was then added to the above sample to provide 0.42% by weight of cobalt calculated as cobalt metal on the acrylic copolymer latex solids.

Four further portions of the aqueous acrylic copolymer latex, each containing 82.50 parts of copolymer solids were treated in a similar manner, but in the first three substituting 6.20 parts of thickeners Nos. 2, 3 and 4 respectively (added as 10% aqueous solutions) for the thickener No. 1 and omitting thickener entirely from the last sample, to provide a control sample free of autoxidizable material.

Films about 2 mil thick of the five treated latex samples prepared as above were separately spread on plate glass and allowed to air-dry at room temperature (20° C.).

All samples dried to give smooth, well-integrated continuous films. After 24 hours and again after 12 days the hardness of each film was measured using a diamond indentation hardness tester, the hardness being expressed as, and being inversely proportional to, the length of the diamond impression.

The results were as follows:

| Sample number | Autoxidizable material | Length of diamond impression 24 hrs. | Length of diamond impression 12 days |
|---|---|---|---|
| 1 | 1 | 5.6 | 5.0 |
| 2 | 2 | 4.4 | 4.0 |
| 3 | 3 | 6.0 | 5.7 |
| 4 | 4 | 4.3 | 4.3 |
| 5 | | 7.7 | 7.6 |

It will be seen that all of the films containing an autoxidizable thickener were appreciably harder than the control sample after 24 hours and remained so after ageing for 12 days.

We claim:

1. A composition which comprises a dispersion of water-dispersible film-forming polymer having a glass transition temperature in the range −80 to 110° C. and an aqueous liquid, an autoxidizable material which in the presence of oxygen provides free radicals to initiate addition polymerization and an ethylenically unsaturated monomer which is homopolymerizable by such radicals the autoxidizable material containing a methylene group adjacent at least one activating group selected from the group consisting of ethylenically unsaturated group and an ether oxygen atom.

2. A composition as claimed in claim 1 wherein the film-forming polymer has a glass transition temperature higher than the temperature at which an integrated film is to be formed by coalescence of the disperse film-forming polymer and the autoxidizable material is a compatible coalescing agent for the said polymer.

3. A composition as claimed in claim 1 wherein the film-forming polymer has a glass transition temperature higher than the temperature at which an integrated film is to be formed by coalescence of the disperse film-forming polymer and the ethylenically unsaturated monomer is a compatible coalescing agent for the said polymer.

4. A composition as claimed in claim 1 wherein the film-forming polymer has a glass transition temperature substantially the same as or lower than the temperature at which an integrated film is to be formed by coalescence of the disperse film-forming polymer, the integrated film hardening by autoxidation and polymerisation of at least one monomer selected from the group consisting of alkyl esters of acrylic, methacrylic, ethacrylic, maleic, itaconic, fumaric and crotonic acids, esters and ethers of vinyl alcohol, styrene, vinyl toluene and vinylidene chloride.

5. A composition as claimed in claim 1 wherein the autoxidizable material contains a drying oil moiety.

6. A composition as claimed in claim 1 wherein the autoxidizable material contains an allylic moiety.

7. A composition which comprises a dispersion of film-forming polymer in an aqueous liquid, an autoxidizable material which in the presence of oxygen provides free radicals to initiate addition polymerization and an ethylenically unsaturated monomer which is homopolymerizable by such radicals, the autoxidizable material being a polymer which contains a methylene group adjacent an ether oxygen atom.

8. A composition which comprises a dispersion of film-forming polymer in an aqueous liquid, an autoxidizable material which in the presence of oxygen provides free radicals to initiate addition polymerization and an ethylenically unsaturated monomer which is homopolymerizable by such radicals, the autoxidizable material being a homopolymer or an autoxidizable copolymer of vinyl pyrrolidone.

9. A composition as claimed in claim 1 wherein there is present from 0.5–50.0% by weight of autoxidizable material based on the weight of film-forming polymer.

10. A composition as claimed in claim 1 wherein the autoxidizable material is compatible with the film-forming polymer.

11. A composition as claimed in claim 1 wherein there is present a redox catalyst.

12. A composition as claimed in claim 11 containing from 0.1–5.0% of a metal drier.

13. A composition as claimed in claim 11 wherein the redox catalyst is sodium bisulphite.

14. A composition as claimed in claim 1 wherein there is present from 2.0–25.0% by weight of ethylenically unsaturated monomer based on the weight of film-forming polymer.

15. A composition as claimed in claim 1 wherein the ethylenically unsaturated monomer is at least one member of the group consisting of alkyl acrylates, alkyl methacrylates, alkyl itaconates, alkyl fumarates, substituted alkyl methacrylates, vinyl benzene and its alkyl derivatives and vinyl esters.

16. A pigmented composition comprising a composition as claimed in claim 1 which additionally contains from 5%–65% of dispersed pigment by volume of the disperse phase.

References Cited

UNITED STATES PATENTS

| | | | |
|---|---|---|---|
| 3,291,768 | 12/1966 | Pfluger et al. | 260—29.6 |
| 3,423,346 | 1/1969 | Klauss et al. | 260—22 |
| 3,425,975 | 2/1969 | Barrett | 260—22 |

OTHER REFERENCES

Lundberg, "Autoxidation and Antioxidants," vol. I, 1961, pp. 212 and 213.

DONALD E. CZAJA, Primary Examiner

R. A. WHITE, Assistant Examiner

U.S. Cl. X.R.

260—22, 29.6, 41